(12) United States Patent
Li (10) Patent No.: US 10,212,475 B2
(45) Date of Patent: Feb. 19, 2019

(54) LIVE VIDEO PROCESSING METHOD AND DEVICE

(71) Applicant: Beijing Xiaomi Mobile Software Co., Ltd., Haidian District, Beijing (CN)

(72) Inventor: Zhigang Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/730,520

(22) Filed: Oct. 11, 2017

(65) Prior Publication Data
US 2018/0103289 A1  Apr. 12, 2018

(30) Foreign Application Priority Data

Oct. 11, 2016 (CN) .......................... 2016 1 0887795

(51) Int. Cl.
| | | |
|---|---|---|
| *H04N 21/41* | (2011.01) | |
| *H04N 21/438* | (2011.01) | |
| *H04N 21/2187* | (2011.01) | |
| *H04N 21/442* | (2011.01) | |
| *H04N 21/482* | (2011.01) | |
| *G06F 1/16* | (2006.01) | |
| *H04N 21/462* | (2011.01) | |
| *G06F 3/0488* | (2013.01) | |

(52) U.S. Cl.
CPC ....... *H04N 21/4383* (2013.01); *G06F 1/1694* (2013.01); *G06F 3/04883* (2013.01); *H04N 21/2187* (2013.01); *H04N 21/442* (2013.01); *H04N 21/4622* (2013.01); *H04N 21/482* (2013.01)

(58) Field of Classification Search
CPC ..................... H04N 21/4126; H04N 21/41407
USPC .................................................. 725/139, 151
See application file for complete search history.

(56) References Cited

FOREIGN PATENT DOCUMENTS

| | | |
|---|---|---|
| CN | 101909160 A | 12/2010 |
| CN | 103139599 A | 6/2013 |
| EP | 2509303 A2 | 10/2012 |
| EP | 2560402 A2 | 2/2013 |

OTHER PUBLICATIONS

Extended European Search Report and European Office Action for European Application No. 17195017.3, dated Nov. 29, 2017.

*Primary Examiner* — Dominic D Saltarelli
(74) *Attorney, Agent, or Firm* — Jun He Law Offices P.C.; James J. Zhu (57) ABSTRACT

The present disclosure relates to a live video processing method and device. The method includes: determining whether a terminal is rotated when the terminal is playing a first live video; determining a current rotation angle and a current rotation direction of the terminal when it is determined that the terminal is rotated; and switching from playing the first live video to playing a second live video according to the current rotation angle and the current rotation direction.

17 Claims, 11 Drawing Sheets

LIVE VIDEO PROCESSING METHOD AND DEVICE

CROSS-REFERENCE TO RELATED APPLICATIONS

This application is based on and claims a priority to Chinese Patent Application No. 201610887795.1, filed with the State Intellectual Property Office of P. R. China on Oct. 11, 2016, the entire contents of which are incorporated herein by reference.

TECHNICAL FIELD

The present disclosure relates to video technology fields, and more particularly, to a live video processing method and device.

BACKGROUND

At present, a user typically switches live videos manually. That is, the user need to click on a next live video manually when switching from a current live video to the next live video. However, this switching mode is tedious and operated manually by the user, thereby increasing operation burdens of the user, and bringing great inconvenience to the user.

SUMMARY

A live video processing method is provided, which includes: determining whether a terminal is rotated when the terminal is playing a first live video; determining a current rotation angle and a current rotation direction of the terminal when it is determined that the terminal is rotated; and switching from playing the first live video to playing a second live video according to the current rotation angle and the current rotation direction.

A live video processing device is provided, which includes: a processor; a memory, configured to store instructions executable by the processor; in which, the processor is configured to determine whether a terminal is rotated when the terminal is playing a first live video; determine a current rotation angle and a current rotation direction of the terminal when it is determined that the terminal is rotated; and switch from playing the first live video to playing a second live video according to the current rotation angle and the current rotation direction.

A non-transitory computer-readable storage medium is provided, which has stored therein instructions that, when executed by a processor of a terminal, causes the terminal to perform a live video processing method, which includes: determining whether a terminal is rotated when the terminal is playing a first live video; determining a current rotation angle and a current rotation direction of the terminal when it is determined that the terminal is rotated; and switching from playing the first live video to playing a second live video according to the current rotation angle and the current rotation direction.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

At present, a user typically switches the live videos manually. That is, the user need to click on a next live video manually when switching from a current live video to the next live video. However, this switching mode is tedious and operated manually by the user, thereby increasing operation burdens of the user, and bringing great inconvenience to the user.

In addition, current video live products are mostly played one-to-one. That is, one terminal can only play one live video at one time point. In this way, when a user wants to switch from the current live video to another live video at this time, he needs to interrupt the current live video, find a next interested live video and then open it, so as to watch the next interested live video, which allows the user to watch only one live video at the same time.

In order to solve technical problems described above, embodiments of the present disclosure provide a live video processing method. The method may be applicable to a program, a system or a device for processing the live video and a performer corresponding to the method can be a terminal capable of playing the live video such as a mobile phone, a tablet and a computer.

Figure 1:
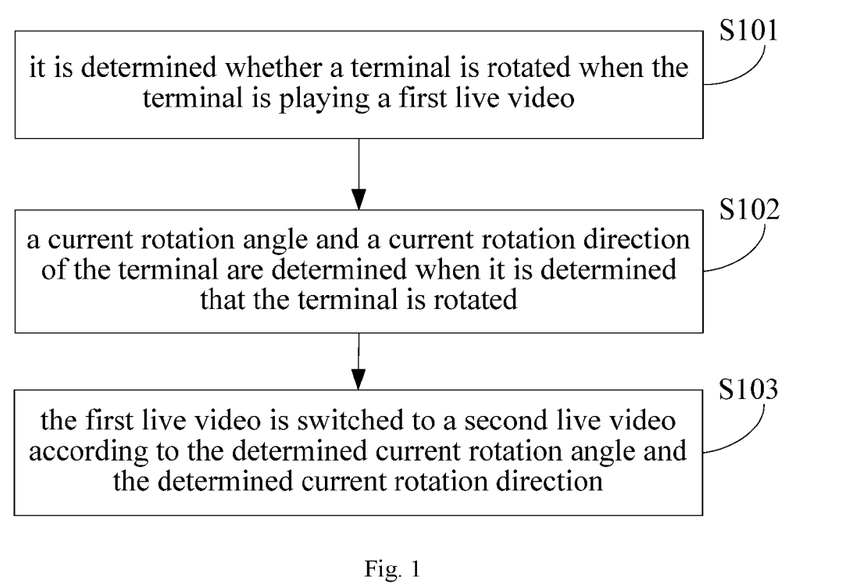
FIG. 1 is a flow chart of a live video processing method according to an exemplary embodiment.

FIG. 1 is a flow chart of a live video processing method according to an exemplary embodiment. As illustrated in FIG. 1, the method includes block S101 to block S103.

In block S101, it is determined whether a terminal is rotated when the terminal is playing a first live video.

The terminal can be a device capable of playing the live video such as a mobile phone, a tablet and a computer. The terminal may be rotated in a preset plane (such as a horizontal plane parallel to the ground or a vertical plane perpendicular to the ground) or in an actual three-dimensional space.

In block S102, a current rotation angle and a current rotation direction of the terminal are determined when it is determined that the terminal is rotated.

The current rotation angle can be represented as, with reference to a preset reference direction, an angle of the terminal rotated in the preset plane with respect to the preset reference direction. For example, when the rotation occurs in the preset plane, the current rotation angle can be represented as an included angle between the terminal and the preset reference direction in the preset plane. For another example, when the rotation occurs in the actual three-dimensional space, the current rotation angle can further be represented as the included angle between the terminal and the preset reference direction in the preset plane with reference to the preset reference direction (i.e., the included angle between a position component in the preset plane of the current position in the three-dimensional space after the terminal is rotated and the preset reference direction).

In block S103, the first live video is switched to a second live video according to the current rotation angle and the current rotation direction.

When the terminal is playing the first live video, the current rotation angle and the current rotation direction of the terminal can be determined when the terminal is rotated, and then the first live video is automatically switched to the second live video according to the current rotation angle and the current rotation direction. It is possible to switch live videos automatically according to the current rotation angle and the current rotation direction without any peripheral, thereby greatly facilitating the user, reducing live video switching operations of the user, and improving switching efficiency of the live video.

Figure 2:
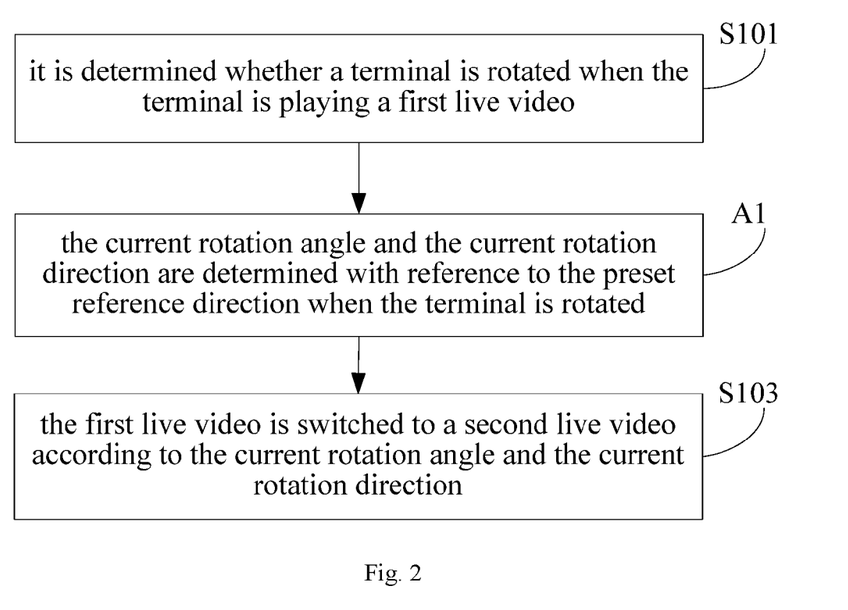
FIG. 2 is a flow chart of another live video processing method according to an exemplary embodiment.

FIG. 2 is a flow chart of another live video processing method according to an exemplary embodiment. As illustrated in FIG. 2, in an embodiment, the block S102 according to FIG. 1 may include block A1.

In block A1, when the terminal is rotated, the current rotation angle and the current rotation direction are determined with reference to the preset reference direction, wherein the current rotation direction includes a clockwise rotation or a counterclockwise rotation.

The preset reference direction may match the preset plane. For example, when the preset plane is the horizontal plane, the preset reference direction may be the due north, the due south, the due east, or the due west in the horizontal plane, or when the preset plane is the vertical plane perpendicular to the ground, the preset reference direction may be the right above direction.

When the terminal is rotated, the current rotation angle and the current rotation direction of the terminal may be determined accurately with reference to the preset reference direction. The current rotation angle can be represented as an included angle between a current direction of a symmetrical axis (Certainly, the symmetrical axis may match a placing posture of the terminal. For example, when the terminal is in a horizontal-grip state, the symmetry axis may be parallel to a short side of the terminal, and when the terminal is in a vertical-grip state, the symmetrical axis may be parallel to a long side of the terminal) of a screen of the terminal and the preset reference direction with reference to the preset reference direction. Indeed, since the rotation may occur in the preset plane or in the actual three-dimensional space, therefore, in order to make the current rotation angle accurate and unaffected by a rotation mode, the current rotation angle can be further represented as an included angle component in the preset plane of the included angle between the determined current direction of the symmetry axis and the preset reference direction based on the preset reference direction.

In addition, in order to make the current rotation angle more accurate, before the terminal is rotated, when one end of the terminal (such as the one end of the terminal for installing a front-facing camera) faces the preset reference direction and the current direction of the symmetrical axis coincides with the preset reference direction, the current rotation angle is defined to be zero degree. After the terminal is rotated, when the one end of the terminal still faces the preset reference direction and the current direction of the symmetrical axis coincides with the preset reference direction, the current rotation angle is defined to be 360 degrees. Similarly, when the other end opposite to the one end of the terminal (For example, when the one end of the terminal is an end for installing the front-facing camera, the other end of the terminal is an end for installing a microphone) faces the preset reference direction and the current direction of the symmetrical axis coincides with the preset reference direction, the current rotation angle is defined to be 180 degrees.

Finally, the current rotation direction is also with reference to the preset reference direction.

Figure 3:
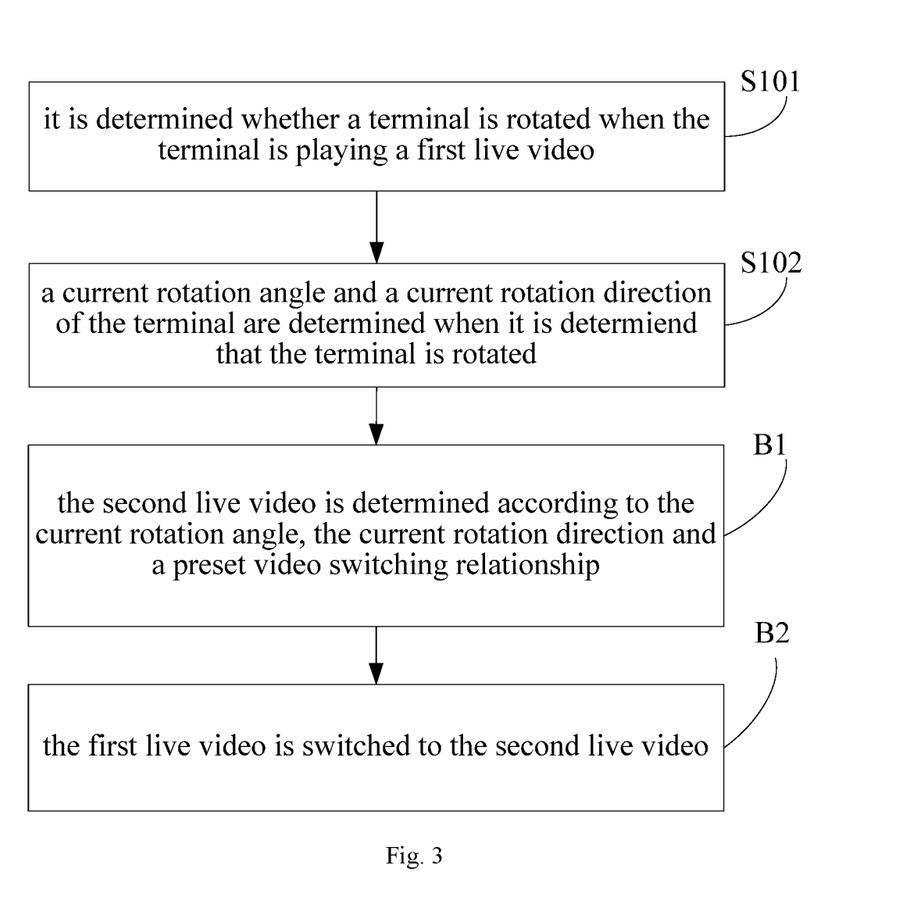
FIG. 3 is a flow chart of another live video processing method according to an exemplary embodiment.

FIG. 3 is a flow chart of another live video processing method according to an exemplary embodiment. As illustrated in FIG. 3, in an embodiment, the block S103 according to FIG. 1 may include block B1 and block B2.

In block B1, the second live video is determined according to the current rotation angle, the current rotation direction and a preset video switching relationship, wherein the preset video switching relationship is configured to characterize a correspondence relationship between respective live videos and respective rotation angles and rotation directions corresponding to the respective live videos, and the preset video switching relationship can be presented in a table form. In addition, a correspondence relationship among the rotation angles corresponding to the respective live videos, the rotation directions corresponding to the respective live videos and identifiers of the respective live videos (the identifiers of the respective live videos include information for uniquely identifying the respective live videos, such as names, serial numbers and live channels of the respective live videos) is pre-stored in the preset video switching relationship.

In block B2, the first live video is switched to the second live video.

Since the preset video switching relationship characterizes the correspondence relationship between the respective live videos and the respective rotation angles and rotation directions, according to the current rotation angle and the current rotation direction, the second live video corresponding to the current rotation angle and the current rotation direction can be searched with reference to the preset video switching relationship. Therefore, it is possible to automatically switch from the first live video to the second live video without switching the live videos by the user manually, thereby greatly facilitating the user and reducing live video switching operations of the user.

Indeed, the rotation angle corresponding to the respective live video can be an angle interval. For example, the rotation angle corresponding to the first live video can be defined as: with reference to the preset reference direction, an included angle component in the preset plane of the included angle between the current direction of the symmetrical axis of the terminal and the preset reference direction is 0~30 degrees. The rotation angle corresponding to the second live video can be defined as: based on the preset reference direction, an included angle component in the preset plane of the included angle between the current direction of the symmetrical axis of the terminal and the preset reference direction is 30~60 degrees. In this way, when determining the second live video according to the preset video switching relationship, the angle interval corresponding to the current rotation is determined, and then the second live video is determined accurately according to the angle interval (the angle interval is the rotation angle corresponding to some live video), the current rotation direction and the preset rotation relationship.

Figure 4:
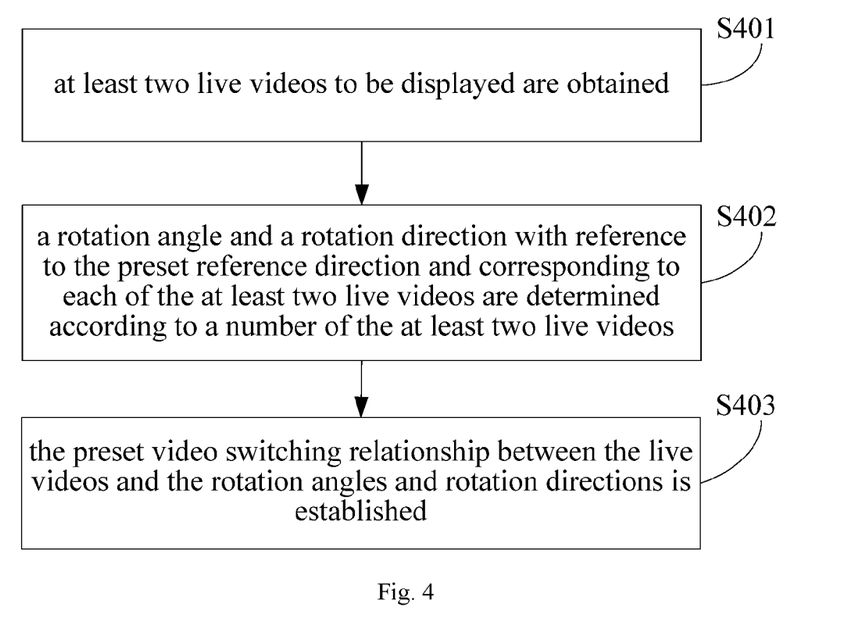
FIG. 4 is a flow chart of another live video processing method according to an exemplary embodiment.

FIG. 4 is a flow chart of another live video processing method according to an exemplary embodiment. As illustrated in FIG. 4, before performing the block S101 according to FIG. 1, the above method further includes block S401 to block S403.

In block S401, at least two live videos to be displayed are obtained, wherein the at least two live videos at least include the first live video and the second live video.

The at least two live videos to be displayed may be interested live videos selected by the user, and may also be a number of live videos pushed by a live platform according to preferences of the user.

In addition to the first live video and the second live video, the at least two live videos may also include other live videos. Therefore, the at least two live video are at least two different live videos, and different live videos can be a same type or a different type of live videos currently played by different live channels.

In block S402, a rotation angle and a rotation direction with reference to the preset reference direction and corresponding to each of the at least two live videos are determined according to a number of the at least two live videos.

Since an angle in the plane is at most 360 degrees, the rotation angle corresponding to each live video can be determined according to the number of the at least two live videos. For example, when the number of the live videos is 3, the rotation angles corresponding to the live videos can be 0~120 degrees, 120~240 degrees and 240~360 degrees respectively (the rotation direction corresponding to this rotation angle distribution mode is the clockwise rotation direction), or the rotation angles corresponding to the live videos can be 0~−120 degrees, −120~−240 degrees and −240~−360 degrees respectively (the rotation direction corresponding to this rotation angle distribution mode is the counterclockwise rotation direction). Of course, which rotation angle corresponding to which live video can be preset or determined by a preset rule (such as preference degrees of the user to the respective live videos). For example, the number of live videos is 3 and the at least two live videos are an A live video, a B live video and a C live video, and it is preset that an absolute value of the rotation angle corresponding to the respective live video increases with the increasing of the preference degree of the user to the respective live video, and according to statistics, the preference degrees of the user to the three live videos are the A live video<the B live video<the C live video, and then the rotation angles corresponding to the A live video, the B live video and the C live video are 0~120 degrees, 120~240 degrees and 240~360 degrees respectively, or 0~−120 degrees, −120~−240 degrees and −240~−360 degrees respectively.

In block S403, the preset video switching relationship between the at least two live videos and the rotation angles and rotation directions is established.

When the at least two live videos to be displayed are obtained, the rotation angle and the rotation direction corresponding to each of the at least two live videos are determined according to the number of the at least two live videos and with reference to the preset reference direction, and further the preset video switching relationship between the live videos and the rotation angles and rotation directions is automatically established, such that when the current rotation direction and the current rotation angle of the terminal are obtained, the second live video to be switched to can be accurately obtained according to the preset video switching relationship.

Figure 5:
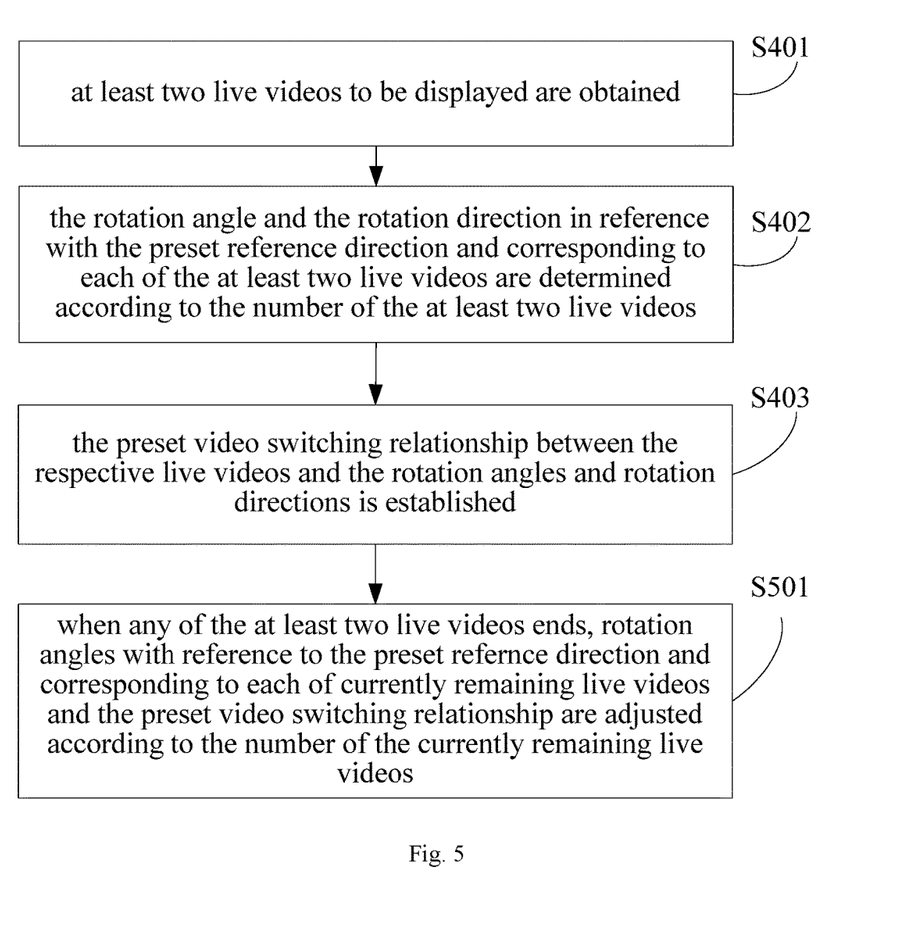
FIG. 5 is a flow chart of another live video processing method according to an exemplary embodiment.

FIG. 5 is a flow chart of another live video processing method according to an exemplary embodiment. As illustrated in FIG. 5, in an embodiment, the method according to FIG. 4 further includes block S501.

In block S501, when any of the at least two live videos ends, rotation angle with reference to the preset reference direction and corresponding to each of currently remaining live videos and the preset video switching relationship are adjusted according to a number of the currently remaining live videos.

When any of the at least two live videos ends, it is possible to adjust rotation angle with reference to the preset reference direction and corresponding to each of the currently remaining live videos and the preset video switching relationship according to the number of the currently remaining live videos, so as to ensure the determined second live video to be accurate, and avoid taking an ended live video as the second live video mistakenly. For example, the at least two live videos are the A live video, the B live video and the C live video, and if the A live video ends, the remaining live videos are the B live video and the C live video, and the number of the remaining live videos are 2. Therefore, the rotation angles with reference to the preset reference direction corresponding to the B live video and the C live video can be adjusted from 120~240 degrees and 240~360 degrees to 0~180 degrees and 180~360 degrees, or the rotation angles with reference to the preset reference direction corresponding to the B live video and the C live video can be adjusted from −120~−240 degrees and −240~−360 degrees to 0~−180 degrees and −180~−360 degrees. The preset video switching relationship is adjusted adaptively at the same time.

Figure 6A:
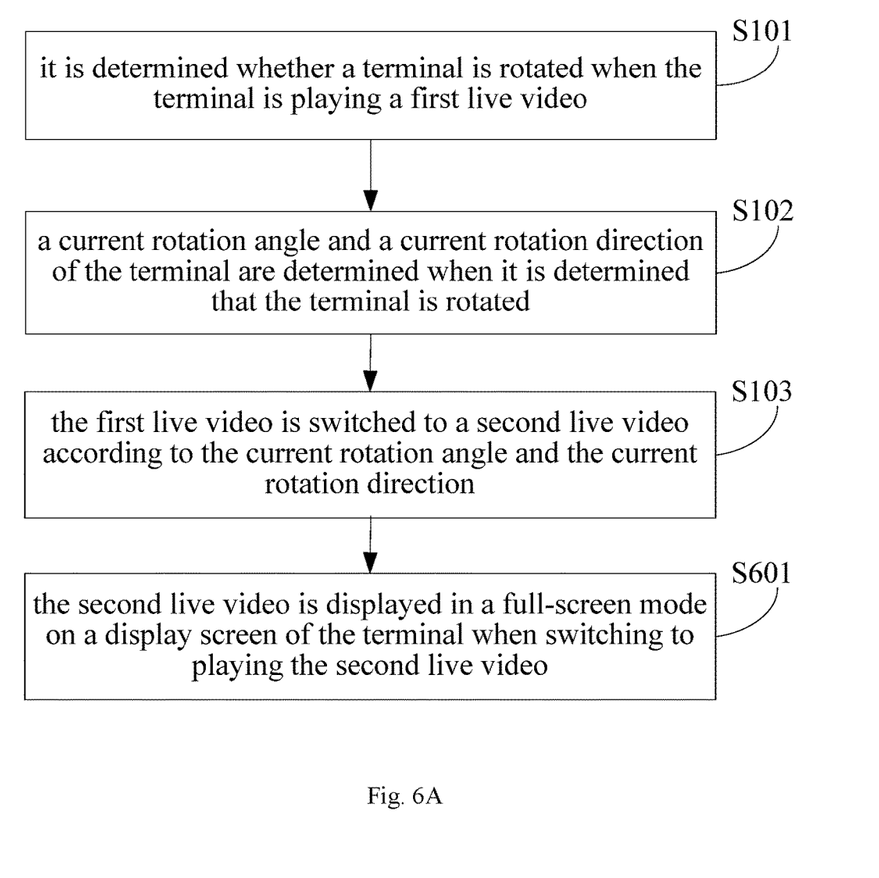
FIG. 6A is a flow chart of another live video processing method according to an exemplary embodiment.

FIG. 6A is a flow chart of another live video processing method according to an exemplary embodiment. As illustrated in FIG. 6A, in an embodiment, the method according to FIG. 1 further includes block S601.

In block S601, the second live video is displayed in a full-screen mode on a display screen of the terminal when switching to playing the second live video, wherein the first live video will be closed automatically when switching to playing the second live video.

When automatically switching to playing the second live video, it is possible to display the second live video in the full-screen mode on the display screen of the terminal to allow the user to watch the second live video in the full-screen mode.

Figure 6B:
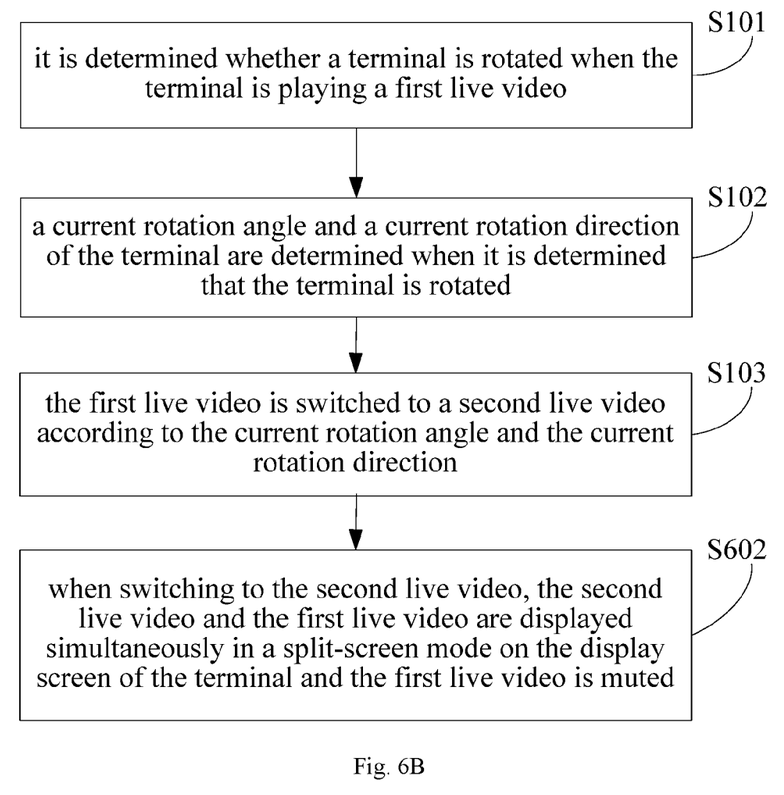
FIG. 6B is a flow chart of another live video processing method according to an exemplary embodiment.

FIG. 6B is a flow chart of another live video processing method according to an exemplary embodiment. As illustrated in FIG. 6B, in an embodiment, the method according to FIG. 1 further includes block S602.

In block S602, when switching to playing the second live video, the second live video and the first live video are displayed simultaneously in a split-screen mode on the display screen of the terminal and the first live video is muted. It may avoid affecting the user to watch and listen to the newly-switched second live video normally by muting the first live video.

When automatically switching to playing the second live video, it is possible to display the second live video and the first live video simultaneously in the split-screen mode on the display screen of the terminal and mute the first live video. In this way, the user can watch and listen to the second live video normally while watching the interested first live video without interrupting the first live video, thereby overcoming the problem that users may watch only one live video at the same time.

Of course, the second live video is the live video switched to after the first live video, and the user may rotate the terminal continuously. Therefore, it may be possible to switch to different live videos continuously in a certain period of time. However, the size of the display screen of the terminal is limited. When there are too many split-screens, a display region of each live video may be too small, thereby affecting watching experience of the user. Therefore, it is possible to limit a maximum number of the split-screens. When the number of live videos played at the same time exceeds the maximum number of the split-screens, the earliest several live videos can be closed automatically (or several live videos with the least interest of users and exceeding the maximum number of the split-screens can be closed automatically). For example, when the maximum number of the split-screens is 3, and it is required to switch to 3 live videos continuously in a period of time, such as switching from the A live video to the B live video, switching from the B live video to the C live video, and switching from the C live video to a D live video. Since the number 4 of the live videos exceeds the maximum number 3 of the split-screens, if the A live video is displayed at the earliest or the A live video has the least interest of the user, the D live video may be displayed normally (the D live video may be not mute), the A live video is closed automatically, the B live video and the C live video are displayed simultaneously, and the B live video and the C live video are muted.

Finally, when switching to the second live video, it is possible to cache other live videos besides the second live video of the at least two live videos for the user to watch the cached live video.

Corresponding to the live video processing method according to embodiments of the present disclosure, embodiments of the present disclosure further provide a live video processing device.

Figure 7:
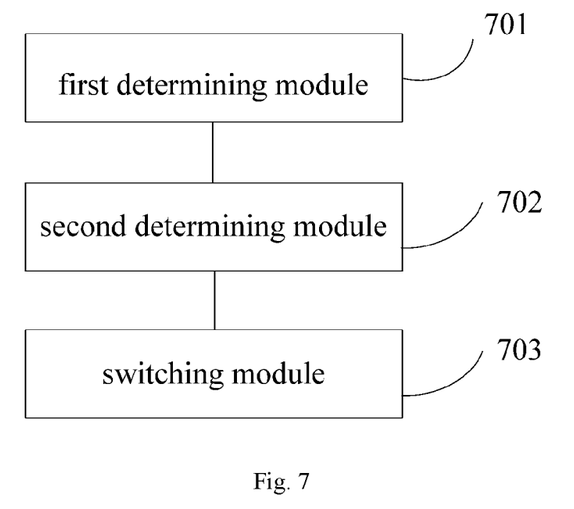
FIG. 7 is a block diagram of a live video processing device according to an exemplary embodiment.

FIG. 7 is a block diagram of a live video processing device according to an exemplary embodiment. As illustrated in FIG. 7, the device includes a first determining module 701, a second determining module 702 and a switching module 703.

The first determining module 701 is configured to determine whether a terminal is rotated when the terminal is playing a first live video.

The second determining module 702 is configured to determine a current rotation angle and a current rotation direction of the terminal when it is determined that the terminal is rotated.

The switching module 703 is configured to switch from playing the first live video to playing a second live video according to the current rotation angle and the current rotation direction.

Figure 8:
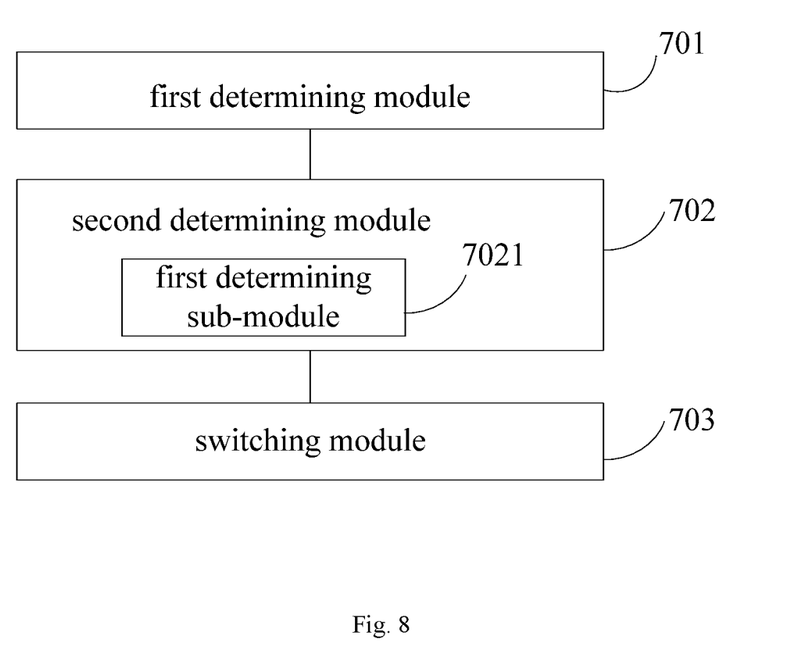
FIG. 8 is a block diagram of another live video processing device according to an exemplary embodiment.

FIG. 8 is a block diagram of another live video processing device according to an exemplary embodiment. As illustrated in FIG. 8, in an embodiment, the second determining module 702 of FIG. 7 may further include a first determining sub-module 7021.

The first determining sub-module 7021 is configured to determine, when the terminal is rotated, the current rotation angle and the current rotation direction with reference to a preset reference direction, wherein the current rotation direction includes a clockwise rotation or a counterclockwise rotation.

Figure 9:
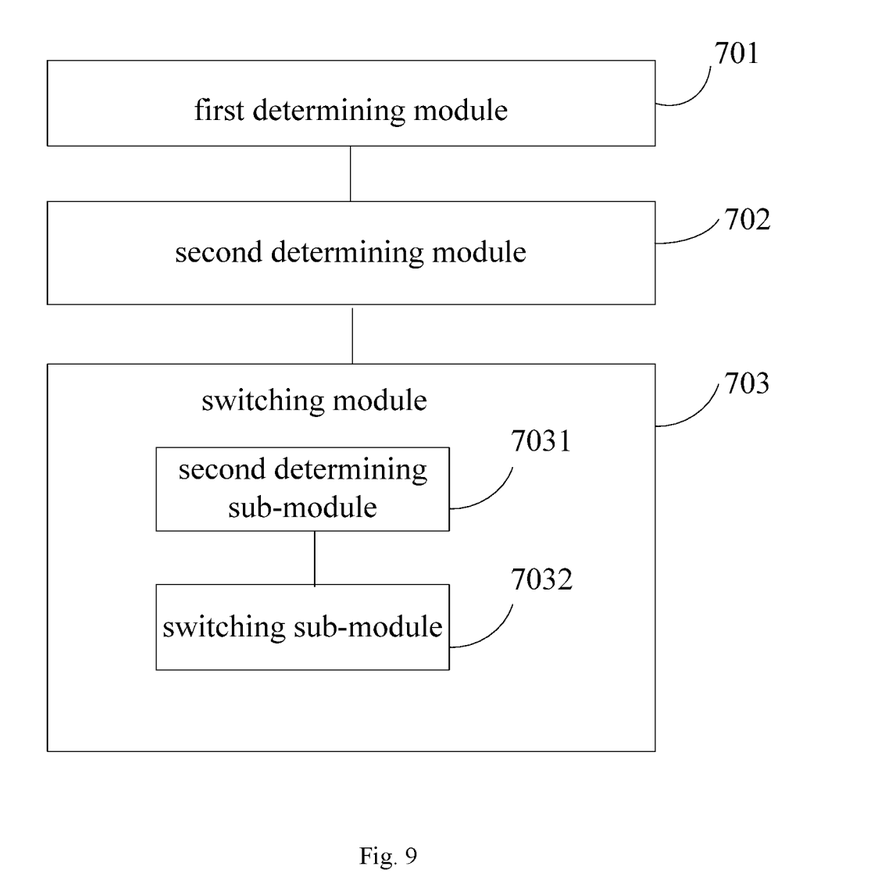
FIG. 9 is a block diagram of another live video processing device according to an exemplary embodiment.

FIG. 9 is a block diagram of another live video processing device according to an exemplary embodiment. As illustrated in FIG. 9, in an embodiment, the switching module 703 of FIG. 7 may include a second determining sub-module 7031 and a switching sub-module 7032.

The second determining sub-module 7031 is configured to determine the second live video according to the current rotation angle, the current rotation direction and a preset video switching relationship, wherein the preset video switching relationship is configured to characterize a correspondence relationship between live videos and rotation angles and rotation directions.

The switching sub-module 7032 is configured to switch from playing the first live video to playing the second live video.

Figure 10:
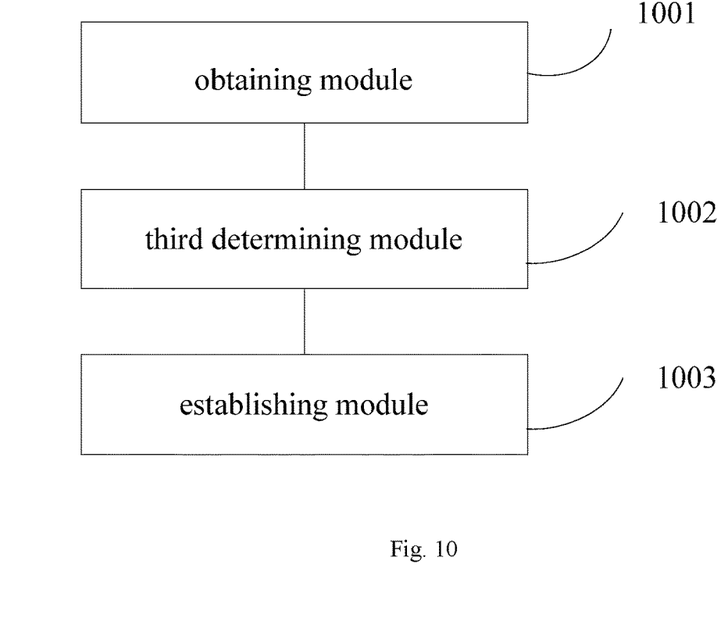
FIG. 10 is a block diagram of another live video processing device according to an exemplary embodiment.

FIG. 10 is a block diagram of another live video processing device according to an exemplary embodiment. As illustrated in FIG. 10, in an embodiment, the device further includes an obtaining module 1001, a third determining module 1002 and an establishing module 1003.

The obtaining module 1001 is configured to obtain at least two live videos to be displayed before determining whether the terminal is rotated, wherein the at least two live videos at least include the first live video and the second live video.

The third determining module 1002 is configured to determine a rotation angle and a rotation direction with reference to the preset reference direction and corresponding to each of the at least two live videos according to a number of the at least two live videos.

The establishing module 1003 is configured to establish the preset video switching relationship between the live videos and rotation angles and the rotation directions.

Figure 11:
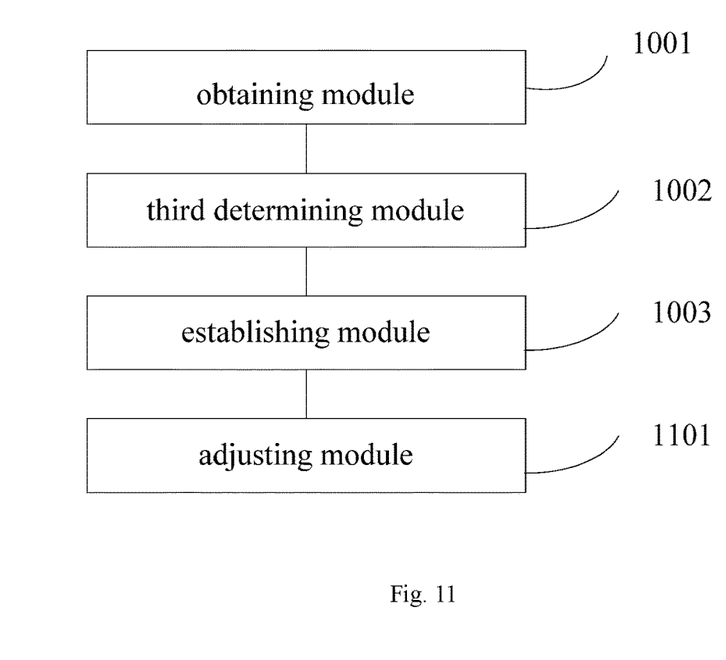
FIG. 11 is a block diagram of another live video processing device according to an exemplary embodiment.

FIG. 11 is a block diagram of another live video processing device according to an exemplary embodiment. As illustrated in FIG. 11, in an embodiment, the device according to FIG. 10 further includes an adjusting module 1101.

The adjusting module 1101 is configured to, when any of the at least two live videos ends, adjust rotation angle with reference to the preset reference direction and corresponding to each of currently remaining live videos and the preset video switching relationship according to the number of the currently remaining live videos.

Figure 12A:
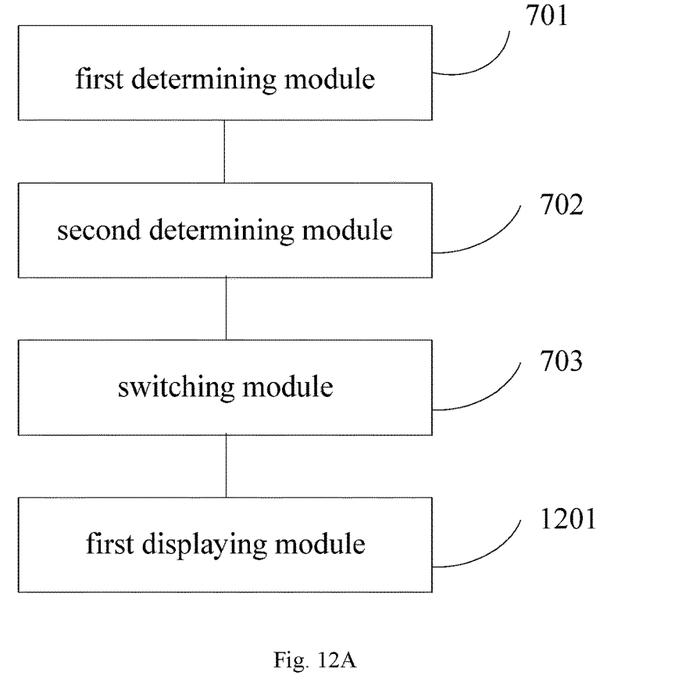
FIG. 12A is a block diagram of another live video processing device according to an exemplary embodiment.

FIG. 12A is a block diagram of another live video processing device according to an exemplary embodiment. As illustrated in FIG. 12A, in an embodiment, the device according to FIG. 7 further includes a first displaying module 1201.

The first displaying module 1201 is configured to display the second live video in a full-screen mode on a display screen of the terminal when switching to playing the second live video.

Figure 12B:
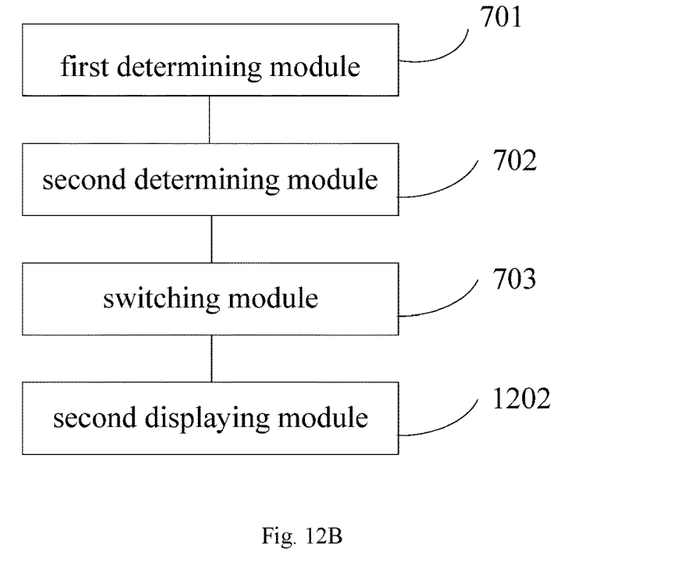
FIG. 12B is a block diagram of another live video processing device according to an exemplary embodiment.

FIG. 12B is a block diagram of another live video processing device according to an exemplary embodiment. As illustrated in FIG. 12B, the device according to FIG. 7 further includes a second displaying module 1202.

The second displaying module 1202 is configured to display the second live video and the first live video simultaneously in a split-screen mode on the display screen of the terminal and mute the first live video when switching to playing the second live video.

According to a third aspect of embodiments of the present disclosure, there is provided a live video processing device, including: a processor; a memory, configured to store instructions executable by the processor; in which, the processor is configured to determine whether a terminal is rotated when the terminal is playing a first live video; determine a current rotation angle and a current rotation direction of the terminal when it is determined that the terminal is rotated; and switch from playing the first live video to playing a second live video according to the current rotation angle and the current rotation direction.

The processor is further configured to, determining a current rotation angle and a current rotation direction of the terminal when it is determined that the terminal is rotated, by acts of: determining, when the terminal is rotated, the current rotation angle and the current rotation direction with reference to a preset reference direction, in which, the current rotation direction includes a clockwise rotation or a counterclockwise rotation.

The processor is further configured to, switching from playing the first live video to playing a second live video according to the current rotation angle and the current rotation direction, by acts of: determining the second live video according to the current rotation angle, the current rotation direction and a preset video switching relationship, in which, the preset video switching relationship is configured to characterize a correspondence relationship between respective live videos and rotation angles and rotation directions; and switch from playing the first live video to playing the second live video.

The processor is further configured to, before determining whether the terminal is rotated, obtain at least two live videos to be displayed, wherein the at least two live videos at least include the first live video and the second live video; determine a rotation angle and a rotation direction with reference to the preset reference direction and corresponding to each of the at least two live videos according to the number of the at least two live videos; and establish the preset video switching relationship between the at least two live videos and the rotation angles and rotation directions corresponding to the respective live videos.

The processor is further configured to: when any of the at least two live videos ends, adjust rotation angle with reference to the preset reference direction and corresponding to each of currently remaining live videos and the preset video switching relationship according to a number of the currently remaining live videos.

The processor is further configured to: display the second live video in a full-screen mode on a display screen of the terminal when switching to playing the second live video; or display the second live video and the first live video simultaneously in a split-screen mode on the display screen of the terminal and mute the first live video when switching to playing the second live video.

Figure 13:
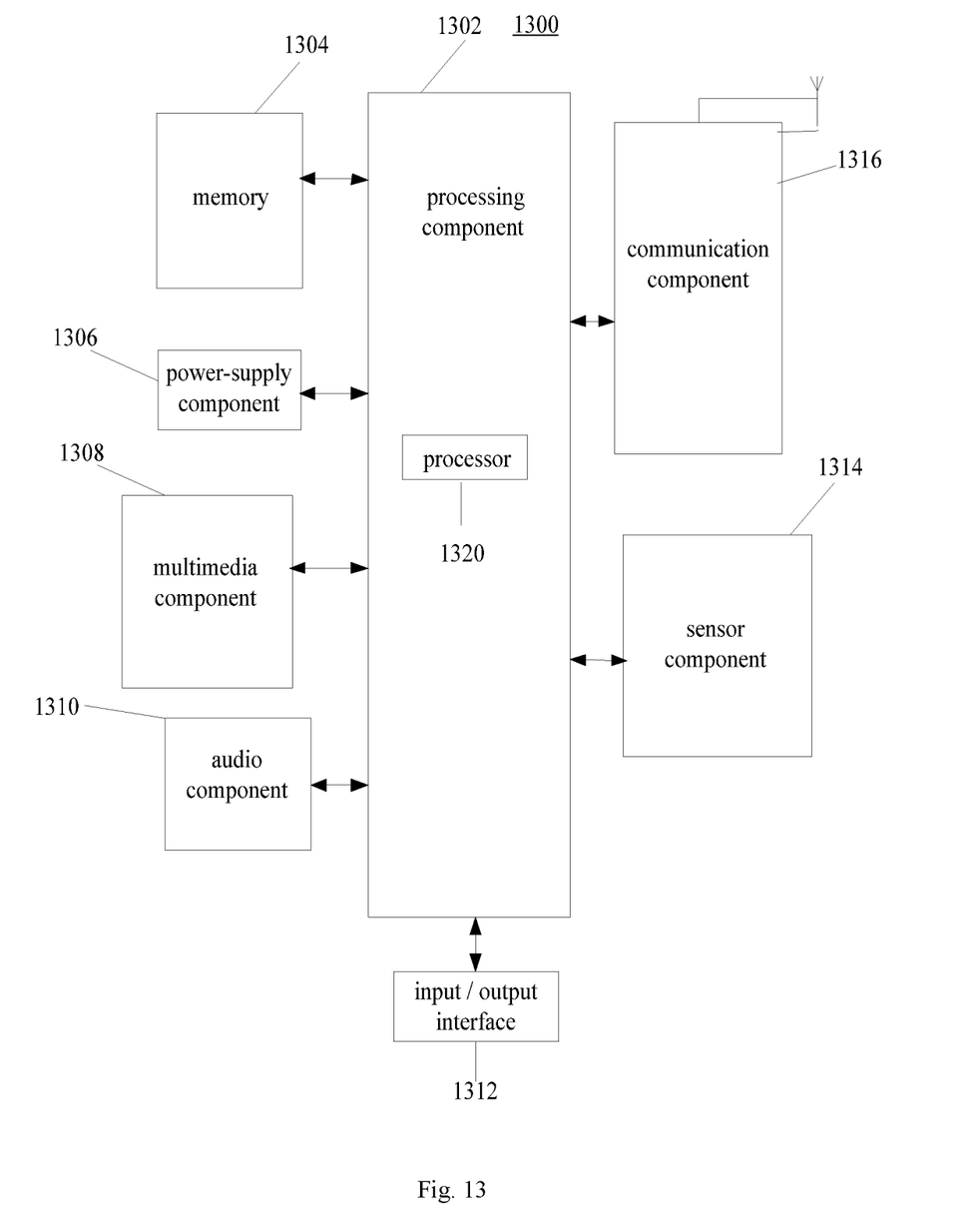
FIG. 13 is a block diagram of a live video processing device according to an exemplary embodiment.

FIG. 13 is a block diagram of a live video processing device 1300 according to an exemplary embodiment, and the device is applicable to the terminal. For example, the device 1300 may be a mobile phone, a computer, a digital broadcasting terminal, a message transceiver device, a game console, a tablet device, a medical device, a fitness device, a personal digital assistant, etc.

According to FIG. 13, the device 1300 may include one or at least two components of the followings: a processing component 1302, a memory 1304, a power-supply component 1306, a multimedia component 1308, an audio component 1310, an input/output (I/O) interface 1312, a sensor component 1314, and a communication component 1316.

The processing component 1302 generally controls an overall operation of the device 1300, such as operations associated with display, phone call, data communication, camera operation, and recording operation. The processing component 1302 may include one or at least two processors 1320 to execute instructions to complete all or part of the blocks of the method. In addition, the processing component 1302 may include one or at least two modules to facilitate interactions between the processing component 1302 and other components. For example, the processing component 1302 may include a multimedia module to facilitate the interaction between a multimedia component 1308 and the processing component 1302.

The memory 1304 is configured to store various types of data to support operations of the device 1300. Examples of the data include any storage objects or method instructions, contact data, phone book data, messages, pictures and videos configured to operate on the device 1300. The memory 1304 may be implemented by any type of volatile memory device or nonvolatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or a compact disc.

The power-supply component 1306 provides power to various components of the device 1300. The power-supply component 1306 may include a power management system, one or at least two power supplies, and other components associated with generating, managing, and distributing power for the device 1300.

The multimedia component 1308 includes a screen that provides an output interface between the device 1300 and the user. In some embodiments, the screen may include a liquid crystal display (LCD) and a touch panel (TP). When the screen includes the touch panel, the screen may be implemented as a touch screen to receive input signals from the user. The touch panel includes one or at least two touch sensors to sense touch, slide, and gestures on the touch panel. The touch sensor can sense boundaries of touch or slide operations, and can also detect durations and pressures associated with the touch or the slide operations. In some embodiments, the multimedia component 1308 includes a front-facing camera and/or a rear-facing camera. When the device 1300 is in an operating mode, such as a shooting mode or a video mode, the front-facing camera and/or the rear-facing camera can receive external multimedia data. Each front-facing camera and rear-facing camera may be a fixed optical lens system or have focal length and optical zoom capability.

The audio component 1310 is configured to output and/or input an audio signal. For example, the audio component 1310 includes a microphone (MIC), when the device 1300 is in the operating mode, such as a call mode, a recording mode and a speech recognition mode, the microphone is configured to receive an external audio signal. The received audio signal may be further stored in the memory 1304 or be transmitted via the communication component 1316. In some embodiments, the audio component 1310 further includes a speaker configured to output the audio signal The I/O interface 1312 provides an interface between the processing component 1302 and a peripheral interface module. The peripheral interface module may be a keyboard, a click wheel, a button or the like. The button may include but is not limited to a home page button, a volume button, a start button and a lock button.

The sensor component 1314 includes one or at least two sensors configured to provide state evaluation of various aspects for the device 1300. For example, the sensor component 1314 may detect an on/off state of the device 1300 and relative positioning of the component. For example, the component is a display and a keypad of the device 1300, the sensor component 1314 may also detect a position change of the device 1300 or one component of the device 1300, presence or absence of contacting of the user with the device 1300, an orientation or an acceleration/deceleration of the device 1300 and a temperature change of the device 1300. The sensor component 1314 may include a proximity sensor configured to detect presence of nearby objects without any physical contact. The sensor component 1314 may also include an optical sensor, such as a complementary metal-oxide semiconductor (CMOS) image sensor or a charge coupled device (CCD) image sensor configured to use in an imaging application. In some embodiments, the sensor component 1314 may also include an acceleration sensor, a gyroscope sensor, a magnetic sensor, a pressure sensor or a temperature sensor.

The communication component 1316 is configured to facilitate wired or wireless communications between the device 1300 and other devices. The device 1300 may access a wireless network based on a communication standard, such as WiFi, 2G or 3G or combinations thereof. In an exemplary embodiment, the communication component 1316 receives a broadcast signal or broadcast-related information from an external broadcast management system via a broadcast channel. In an exemplary embodiment, the communication component 1316 also includes a near field communication (NFC) module to facilitate a short-range communication. For example, the NFC module can be implemented based on a radio frequency identification (RFID) technology, an infrared data association (IrDA) technology, an ultra-wideband (UWB) technology, a blue tooth (BT) technology and other technologies.

In some exemplary embodiments, the device 1300 may be implemented by one or at least two application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, configured to perform the method described above.

In some exemplary embodiments, there is also provided a non-temporary computer readable storage medium including instructions, such as a memory 1304 including instructions, the instructions are executable by the processor 1320 of the device 1300 to perform the method described above. For example, the non-temporary computer readable storage medium may be a read-only memory (ROM), a random access memory (RAM), a CD-ROM, a magnetic tape, a floppy disk, and an optical data storage device.

A non-temporary computer readable storage medium, when the instructions in the storage medium are executed by the processor of the device 1300, the device 1300 is configured to execute a live video processing method, including: determining whether a terminal is rotated when the terminal is playing a first live video; determining a current rotation angle and a current rotation direction of the terminal when it is determined that the terminal is rotated; and switching from playing the first live video to playing a second live video according to the current rotation angle and the current rotation direction.

In an embodiment, determining a current rotation angle and a current rotation direction of the terminal when it is determined that the terminal is rotated includes: determining, when the terminal is rotated, the current rotation angle and the current rotation direction with reference to a preset reference direction, wherein the current rotation direction includes a clockwise rotation or a counterclockwise rotation.

In an embodiment, switching from playing the first live video to playing a second live video according to the current rotation angle and the current rotation direction includes: determining the second live video according to the current rotation angle, the current rotation direction and a preset video switching relationship, wherein the preset video switching relationship is configured to characterize a correspondence relationship between respective live videos and rotation angles and rotation directions; and switching from playing the first live video to playing the second live video.

In an embodiment, before determining whether the terminal is rotated, the method further includes: obtaining at least two live videos to be displayed, wherein the at least two live videos at least include the first live video and the second live video; determining a rotation angle and a rotation direction with reference to the preset reference direction and corresponding to each of the at least two live videos according to a number of the at least two live videos; and establishing the preset video switching relationship between the at least two live videos and the rotation angles and rotation directions.

In an embodiment, the method further includes: adjusting, when any of the at least two live videos ends, rotation angle with reference to the preset reference direction and corresponding to each of currently remaining live videos and the preset video switching relationship according to a number of the currently remaining live videos.

In an embodiment, the method further includes: displaying the second live video in a full-screen mode on a display screen of the terminal when switching to playing the second live video; or displaying the second live video and the first live video simultaneously in a split-screen mode on the display screen of the terminal and muting the first live video when switching to playing the second live video.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A live video processing method, comprising:
 establishing a preset video switching relationship for characterizing a correspondence relationship between at least two live videos and rotation angles and rotation directions;
 determining whether a terminal is rotated when the terminal is playing a first live video of the at least two live videos;
 determining a current rotation angle and a current rotation direction of the terminal when it is determined that the terminal is rotated;
 switching from playing the first live video to playing a second live video of the at least two live videos according to the current rotation angle and the current rotation direction and the preset video switching relationship; and
 adjusting, when any of the at least two live videos ends, the preset video switching relationship for currently remaining live videos of the at least two live videos.

2. The method according to claim 1, wherein determining a current rotation angle and a current rotation direction of the terminal when it is determined that the terminal is rotated comprises:
 determining, when the terminal is rotated, the current rotation angle and the current rotation direction with reference to a preset reference direction, wherein the current rotation direction comprises a clockwise rotation or a counterclockwise rotation.

3. The method according to claim 1 wherein establishing a preset video switching relationship configured to characterize a correspondence relationship between at least two live videos and rotation angles and rotation directions comprises:
 obtaining the at least two live videos to be displayed, wherein the at least two live videos at least comprise the first live video and the second live video;
 determining, for each live video of the at least two live videos, a rotation angle and a rotation direction with reference to the preset reference direction according to a number of the at least two live videos; and
 establishing the preset video switching relationship between the at least two live videos and the rotation angles and rotation directions.

4. The method according to claim 3, wherein adjusting, when any of the at least two live videos ends, the preset video switching relationship for currently remaining live videos of the at least two live videos comprises
 adjusting, for each of the currently remaining live videos, when any of the at least two live videos ends, a rotation angle with reference to the preset reference direction according to a number of the currently remaining live videos.

5. The method according to claim 3, wherein the rotation angle corresponding to each of the at least two live videos is an angle interval.

6. The method according to claim 3, wherein in the preset video switching relationship, an absolute value of the rotation angle corresponding to the respective live video increases with a preference degree of a user to the respective live video.

7. The method according to claim 1, further comprising:
 displaying the second live video in a full-screen mode on a display screen of the terminal when switching to playing the second live video; or
 displaying the second live video and the first live video simultaneously in a split-screen mode on the display screen of the terminal and muting the first live video when switching to playing the second live video.

8. A live video processing device, comprising:
 a processor;
 a memory, configured to store instructions executable by the processor,
 wherein, the processor is configured to:
 establish a preset video switching relationship for characterizing a correspondence relationship between at least two live videos and rotation angles and rotation directions;
 determine whether a terminal is rotated when the terminal is playing a first live video of the at least two live videos;
 determine a current rotation angle and a current rotation direction of the terminal when it is determined that the terminal is rotated;
 switch from playing the first live video to playing a second live video of the at least two live videos according to the current rotation angle and the current rotation direction and the preset video switching relationship; and
 adjust, when any of the at least two live videos ends, the preset video switching relationship for currently remaining live videos of the at least two live videos.

9. The device according to claim 8, wherein the processor is configured to determine a current rotation angle and a current rotation direction of the terminal when it is determined that the terminal is rotated by acts of:
 determining, when the terminal is rotated, the current rotation angle and the current rotation direction with reference to a preset reference direction, wherein the current rotation direction comprises a clockwise rotation or a counterclockwise rotation.

10. The device according to claim 8, wherein the processor is further configured to,
 obtain the at least two live videos to be displayed, wherein the at least two live videos at least comprise the first live video and the second live video;
 determine, for each live video of the at least two live videos, a rotation angle and a rotation direction with reference to the preset reference direction according to a number of the at least two live videos; and
 establish the preset video switching relationship between the at least two live videos and the rotation angles and rotation directions.

11. The device according to claim 10, wherein the processor is further configured to:
 adjust, for each of the currently remaining live videos, when any of the at least two live video ends, a rotation angle with reference to the preset reference direction according to a number of the currently remaining live videos.

12. The device according to claim 8, wherein the processor is further configured to:
 display the second live video in a full-screen mode on a display screen of the terminal when switching to playing the second live video; or
 display the second live video and the first live video simultaneously in a split-screen mode on the display screen of the terminal and muting the first live video when switching to playing the second live video.

13. A non-transitory computer-readable storage medium having stored therein instructions that, when executed by a processor of a terminal, causes the terminal to perform a live video processing method, which comprises:
- establishing a preset video switching relationship for characterizing a correspondence relationship between at least two live videos and rotation angles and rotation directions;
- determining whether a terminal is rotated when the terminal is playing a first live video of the at least two live videos;
- determining a current rotation angle and a current rotation direction of the terminal when it is determined that the terminal is rotated;
- switching from playing the first live video to playing a second live video of the at least two live videos according to the current rotation angle and the current rotation direction; and the preset video switching relationship; and
- adjusting, when any of the at least two live videos ends, the preset video switching relationship for currently remaining live videos of the at least two live videos.

14. The non-transitory computer-readable storage medium according to claim 13, wherein determining a current rotation angle and a current rotation direction of the terminal when it is determined that the terminal is rotated comprises:
- determining, when the terminal is rotated, the current rotation angle and the current rotation direction with reference to a preset reference direction, wherein the current rotation direction comprises a clockwise rotation or a counterclockwise rotation.

15. The non-transitory computer-readable storage medium according to claim 13, wherein establishing a preset video switching relationship for characterizing a correspondence relationship between at least two live videos and rotation angles and rotation directions comprises:
- obtaining the at least two live videos to be displayed, wherein the at least two live videos at least comprise the first live video and the second live video;
- determining, for each live video of the at least two live videos, a rotation angle and a rotation direction with reference to the preset reference direction according to a number of the at least two live videos; and
- establishing the preset video switching relationship between the at least two live videos and the rotation angles and rotation directions.

16. The non-transitory computer-readable storage medium according to claim 15, wherein adjusting, when any of the at least two live videos ends, the preset video switching relationship for currently remaining live videos of the at least two live videos comprises:
- adjusting, for each of the currently remaining live videos, when any of the at least two live videos ends, a rotation angle with reference to the preset reference direction according to a number of the currently remaining live videos.

17. The non-transitory computer-readable storage medium according to claim 13, wherein the method further comprises:
- displaying the second live video in a full-screen mode on a display screen of the terminal when switching to playing the second live video; or
- displaying the second live video and the first live video simultaneously in a split-screen mode on the display screen of the terminal and muting the first live video when switching to playing the second live video.

* * * * *